(12) United States Patent
Inoue et al.

(10) Patent No.: US 6,467,093 B1
(45) Date of Patent: Oct. 15, 2002

(54) METHOD AND APPARATUS FOR RECEIVING DIGITAL BROADCASTS

(75) Inventors: Hajime Inoue, Chiba (JP); Noriyuki Yamamoto, Tokyo (JP); Sadaharu Sato, Tokyo (JP); Takehiko Nakano, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/244,282

(22) Filed: Feb. 3, 1999

(30) Foreign Application Priority Data

Feb. 4, 1998 (JP) .......................... 10-023340

(51) Int. Cl.[7] .................................. H04N 7/16
(52) U.S. Cl. .................... 725/151; 725/153; 725/68; 386/52; 386/55; 386/111; 386/112
(58) Field of Search .............. 725/68, 70, 85, 725/100, 151, 153, 63; 386/1, 33, 45–46, 35, 111–112, 125, 126, 124, 68, 81–82, 6–8, 52, 55

(56) References Cited

U.S. PATENT DOCUMENTS 5,057,932 A * 10/1991 Lang
5,563,714 A * 10/1996 Inoue et al.
5,727,112 A * 3/1998 Kellar et al.
5,825,967 A * 10/1998 Stewar et al.
5,832,085 A * 11/1998 Inoue et al.
5,844,636 A * 12/1998 Joseph et al.
6,163,644 A * 12/2000 Owashi et al.
6,191,822 B1 * 2/2001 Smyers
6,285,824 B1 * 9/2001 Yanagihara et al.
6,324,126 B1 * 11/2001 Nagano

* cited by examiner

*Primary Examiner*—Andrew Faile
*Assistant Examiner*—Ngoc Vu
(74) *Attorney, Agent, or Firm*—Lerner, David, Littenberg, Krumholz & Mentlik, LLP (57) ABSTRACT

In a digital broadcast receiving apparatus, digital broadcast signals provided by a digital broadcast method are supplied to various types of external units and are effectively utilized. In the above apparatus, a descrambler descrambles a transport stream output from a front end unit and supplies it to a digital interface and a demultiplexer. The demultiplexer extracts from the transport stream a compressed video signal and a compressed audio signal of a program specified by a user, and supplies the extracted signals to an MPEG decoder. The MPEG decoder decompresses the supplied video signal and the audio signal and supplies them to the digital interface, an NTSC encoder, and an audio signal D/A converter. The digital interface supplies either of the transport stream or the decompressed data to a digital external unit under the control of the controller.

13 Claims, 7 Drawing Sheets

METHOD AND APPARATUS FOR RECEIVING DIGITAL BROADCASTS

BACKGROUND OF THE INVENTION

1. Field of the Invention

The present invention relates to a method and an apparatus for receiving digital broadcast signals, for example, digital satellite broadcast signals.

2. Description of the Related Art

As television broadcast systems using geostationary satellites, digital broadcast systems, as well as analog broadcast systems, are coming into use. In the digital broadcast system, signals representing a plurality of television programs compressed according to, for example, the Moving Picture Experts Group (MPEG) method, can be multiplexed onto a single carrier and then be provided.

In a digital broadcast receiving apparatus, a user selects a carrier including the multiplexed television broadcast program that the user would like to audio-visually observe. The selected carrier is then demodulated, thereby obtaining a transport stream in which compressed data representing a plurality of television broadcast programs are multiplexed.

The compressed data of the target television broadcast program is then extracted from the transport stream. The extracted compressed data is decompressed, and an analog output video signal and an analog output audio signal are formed from the decompressed digital data. Images and sound of the target television broadcast program are reproduced from the analog output video signal and the analog output audio signal, respectively.

The above type of digital broadcast receiving apparatus is provided with a digital interface. Through this interface, a transport stream in which compressed data representing a plurality of broadcast programs are multiplexed can be supplied to and recorded on, for example, a digital video tape recorder (hereinafter referred to as the "DVTR"). Also, the recorded transport stream can be supplied from the DVTR to the digital broadcast receiving apparatus, and a television broadcast program contained in the supplied transport stream can be audio-visually observed by using the digital broadcast receiving apparatus.

As discussed above, transport streams are supplied to and received from the digital interface of the digital broadcast receiving apparatus. Accordingly, it is impossible to record and reproduce broadcast program signals output through the digital interface by using only an apparatus that is not provided with a compression/decompression function compatible with a compression method used in digital broadcasting.

For example, it is now assumed that a broadcast program signal provided by digital broadcasting has been recorded on a video tape with a DVTR connected to a digital broadcast receiving apparatus installed in a living room. Such a signal cannot be reproduced by a DVTR installed in another room that is neither connected to a digital broadcast receiving apparatus nor provided with a compression/decompression function compatible with the digital broadcast data compression method.

As noted above, the digital interface of the digital broadcast receiving apparatus supplies and receives transport streams. Thus, signals compressed by the MPEG method that are normally used in broadcasts cannot be recorded on a recording medium through this digital interface. For example, by using a recording/reproducing apparatus that uses as a recording medium a small magneto-optical disc, which is referred to as an MD, having a compression format different from the MPEG method (this apparatus will hereinafter be referred to as a "MD unit"), it is not possible to record on the MD only digital audio signals of a target music program or an education program concerning, for example, English conversation.

As described above, in most cases, the transport streams transmitted and received through the digital interface of a digital broadcast receiving apparatus cannot be utilized without the digital broadcast receiving apparatus. Accordingly, it is not possible to record or reproduce only a target broadcast program on or from a recording medium by using various digital external units, such as a DVTR and an MD unit.

SUMMARY OF THE INVENTION

The present invention provides a method and an apparatus for receiving digital broadcasts, in which broadcast program signals provided by a digital broadcast system can be supplied to various types of digital external units and be more effectively utilized.

According to one aspect of the present invention, there is provided a digital broadcast receiving apparatus comprising broadcast program extraction means for extracting compressed data including a broadcast program selected and specified by a user. Decompression means decompresses the compressed data extracted by the broadcast program extraction means and outputs decompressed data. Digital interface means receives the compressed data extracted by the broadcast program extraction means and the decompressed data from the decompression means, and outputs each of the compressed data and the decompressed data to a digital external unit. Control means controls, based on an instruction from the user, the selection of an output of the compressed data extracted by the broadcast program extraction means or an output of the decompressed data from the decompression means to the digital external unit from the digital interface means.

This makes it possible to receive digital broadcasts in which data is compressed and to directly supply the compressed data of a target broadcast program to the digital external unit, or to supply the decompressed data of a target broadcast program to the digital external unit. Accordingly, it is possible to supply the decompressed data even to a digital external unit which is not provided with a decompression function compatible with the data compression method of digital broadcasting and to utilize the decompressed data by being recorded on a recording medium.

In the aforementioned digital broadcast receiving apparatus, the broadcast program extraction means may comprise a tuner for selecting a carrier component including the broadcast program selected and specified by the user, a front end unit for demodulating the carrier component selected by the tuner and for outputting a transport stream, and selected-program extraction means for extracting compressed data of the broadcast program selected and specified by the user from the transport stream output from the front end unit. The broadcast program extraction means may output the transport stream from the front end unit to the digital interface means and also outputs the compressed data of the broadcast program from the selected-program extraction means to the decompression means. The digital interface means may receive the transport stream from the front end unit and decompressed data from the decompression means and may output each of the transport stream and the decompressed data to the digital external unit. The control means may control, based on an instruction from the user, the selection of an output of the transport stream or the decompressed data to the digital external unit from the digital interface means.

The extracted broadcast program signal may be digital data which is compressed by, for example, the MPEG method. The digital data is then supplied to the decompression means and is decompressed, thereby reproducing the original digital data (decompressed data).

This makes it possible to supply to the digital external unit not only the transport stream in which a plurality of broadcast program signals are multiplexed, but also to supply to the digital external unit the decompressed data of a single broadcast program and to record it on a recording medium used in the digital external unit.

If the decompressed data of a single broadcast program is recorded on a recording medium with the digital external unit, an output audio signal can be formed with the digital external unit to audio-visually observe the target broadcast program without needing to input again the decompressed data into the digital broadcast receiving apparatus provided with the decompression means.

According to another aspect of the present invention, there is provided a digital broadcast receiving apparatus for receiving a mixture of broadcast program signals provided as non-compressed data and broadcast program signals provided as compressed data. The digital broadcast receiving apparatus comprises a tuner for selecting a carrier component including a signal of a broadcast program selected and specified by a user. A front end unit demodulates the carrier component selected by the tuner and outputs a transport stream. Selected-program extraction means extracts the non-compressed data or the compressed data of the broadcast program selected and specified by the user from the transport stream supplied from the front end unit. Digital interface means receives the transport stream from the front end unit and the non-compressed data extracted by the selected-program extraction means, and outputs each of the transport stream and the non-compressed data to a digital external unit. Control means controls, based on an instruction from the user, the selection of an output of the transport stream or the non-compressed data to the digital external unit from the digital interface means.

With this arrangement, a multi-program transport stream and non-compressed data of a single broadcast program can be supplied to the digital external unit according to an instruction from the user. That is, the non-compressed data can be utilized by being recorded on a recording medium used in the digital external unit. Unlike the transport stream, the non-compressed data is not required to be decompressed, and it is unnecessary to input the non-compressed data into the digital broadcast receiving apparatus again when being reproduced. It is thus possible to supply the non-compressed data provided by digital broadcasting to the digital external unit and to effectively utilize it by being recorded on a recording medium.

The aforementioned digital broadcast receiving apparatus may further comprise decompression means for decompressing, if the signal of the broadcast program extracted by the selected-program extraction means is compressed data, the compressed data, and for outputting decompressed data. The digital interface means may receive the transport stream from the front end unit, the non-compressed data from the selected-program extraction means, and the decompressed data from the decompression means, and may output each of the transport stream, the non-compressed data, and the decompressed data to the digital external unit. The control means may control, based on an instruction from the user, the selection of an output of the transport stream, the non-compressed data, or the decompressed data from the digital interface means.

With this arrangement, the multi-program transport stream, the non-compressed data, or the decompressed data can be supplied to the digital external unit according to an instruction from the user. In this case, the digital data to be supplied to the digital external unit can be exchanged in accordance with the type of digital external unit or the method for the use of data. This makes it possible to supply the non-compressed data and the decompressed data provided by digital broadcasting to the digital external unit and to effectively utilize them by being recorded on a recording medium. As a result, information provided by digital broadcasting can be employed more effectively.

In the aforementioned digital broadcast receiving apparatus, the compressed data may comprise data which is compressed by the MPEG method. The non-compressed data may comprise digital data compressed by a method other than the MPEG method.

According to still another aspect of the present invention, there is provided a digital broadcast receiving method comprising: a broadcast program extraction step of extracting compressed data including a broadcast program selected and specified by a user; a decompression step of decompressing the compressed data extracted in the broadcast program extraction step and outputting decompressed data; a digital interface step of outputting each of the compressed data extracted in the broadcast program extraction step and the decompressed data output from the decompression step to a digital external unit; and a control step of controlling, based on an instruction from the user, the selection of an output of the compressed data extracted in the broadcast program extraction step and the decompressed data output from the decompression step to the digital external unit from the digital interface step.

In the aforementioned digital broadcast receiving method, the broadcast program extraction step may comprise a carrier component selection step of selecting a carrier component including a signal of the broadcast program selected and specified by the user, a front end step of demodulating the carrier component selected in the carrier component selection step and outputting a transport stream, and a selected-program extraction step of extracting compressed data of the broadcast program selected and specified by the user from the transport stream output from the front end step. The broadcast program extraction step may output the transport stream to the digital interface step from the front end step, and may also output the compressed data of the broadcast program to the decompression step from the selected-program extraction step. The digital interface step may output each of the transport stream output from the front end step and the decompressed data from the decompression step to the digital external unit. The control step may control, based on an instruction from the user, the selection of an output of the transport stream or the decompressed data to the digital external unit from the digital interface step.

According to a further aspect of the present invention, there is provided a digital broadcast receiving method for receiving a mixture of broadcast program signals provided as non-compressed data and broadcast program signals provided as compressed data. The digital broadcast receiving method comprises: a carrier component selection step of selecting a carrier component including a signal of a broadcast program selected and specified by a user; a front end step of demodulating the carrier component selected in the carrier component selection step and outputting a transport stream; a selected-program extraction step of extracting the non-compressed data or the compressed data of the broadcast program selected and specified by the user from the transport stream output from the front end step; a digital interface step of receiving the transport stream from the front end step and the non-compressed data extracted in the selected-program extraction step and outputting each of the transport stream and the non-compressed data to a digital external unit; and a control step of controlling, based on an instruction from the user, the selection of an output of the transport stream or the non-compressed data to the digital external unit from the digital interface step.

The aforementioned digital broadcast receiving method may further comprise a decompression step of decompressing, if the signal of the broadcast program extracted in the broadcast program extraction step is compressed data, the compressed data, and outputting decompressed data. The digital interface step may output each of the transport stream from the front end step, the non-compressed data from the selected-program extraction step, and the decompressed data from the decompression step to the digital external unit. The control step may control, based on an instruction from the user, the selection of an output of the transport stream, the non-compressed data, or the decompressed data from the digital interface step.

DESCRIPTION OF THE PREFERRED EMBODIMENTS

A description is given hereinbelow, with reference to the drawings, of embodiments of a method and an apparatus for receiving digital broadcasts in accordance with the present invention. As discussed above, there is a certain digital broadcast method in which a plurality of broadcast programs are multiplexed on a single carrier. In receiving apparatuses constructed in accordance with the embodiments described below, signals containing a plurality of multiplexed broadcast programs on a single carrier can be received and demodulated to extract a signal of a target broadcast program.

First Embodiment

Figure 1:
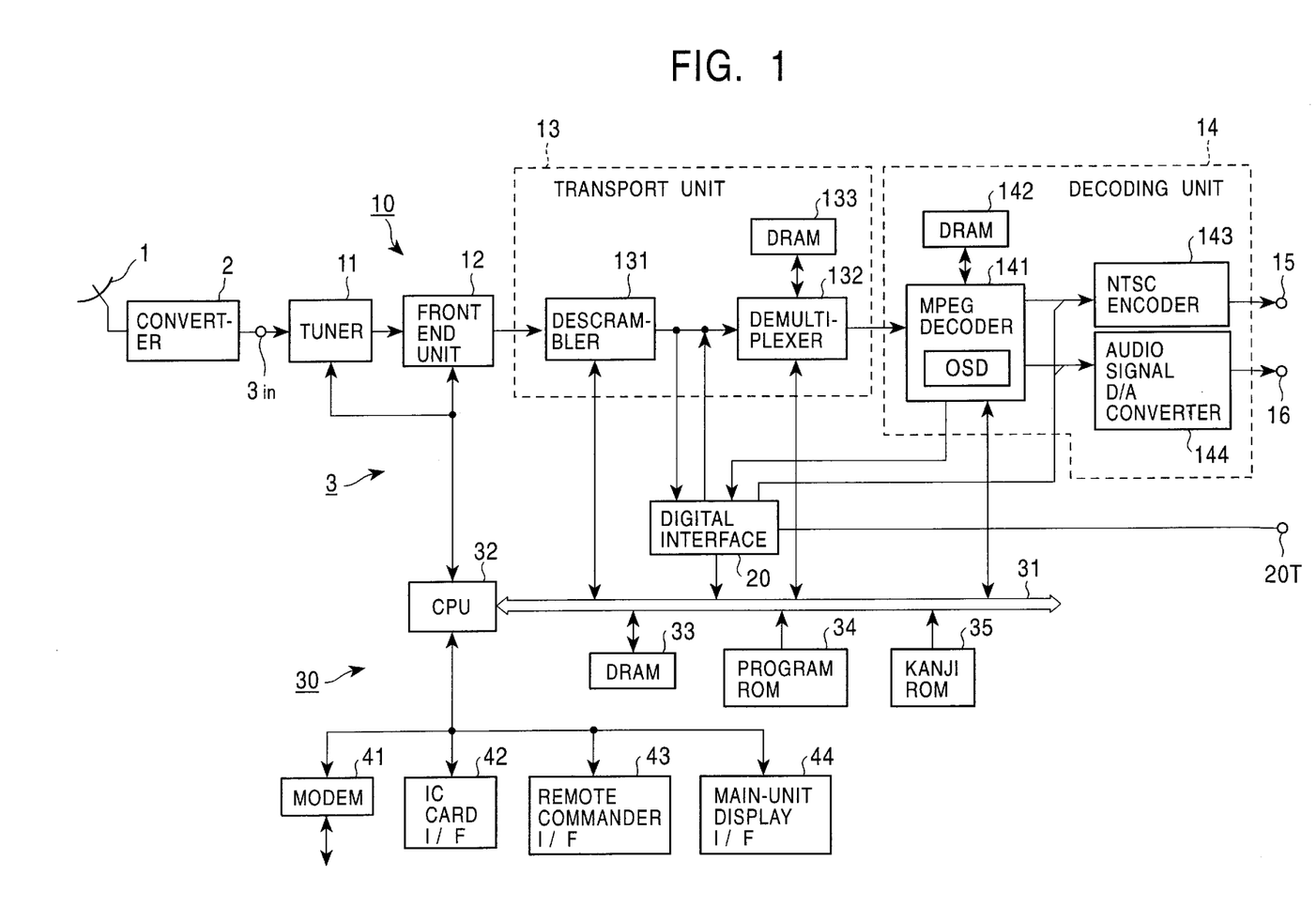
FIG. 1 is a block diagram illustrating a digital broadcast receiving apparatus according to a first embodiment of the present invention.

FIG. 1 is a block diagram illustrating a digital broadcast receiving apparatus 3 (hereinafter simply referred to as the "receiving apparatus") according to a first embodiment of the present invention. In FIG. 1, satellite broadcast waves in a 12 GHz band received by a receiving antenna 1 are frequency-converted into an intermediate frequency signal in a 1 GHz band by a low-noise converter 2, and are then input into the receiving apparatus 3 of the first embodiment via an input terminal 3 in.

The receiving apparatus 3 of this embodiment is basically formed of a received-signal processor 10, a digital interface 20 through which digital data is supplied to and received from digital external units, and a controller 30. The received-signal processor 10, which includes a tuner 11, a front end unit 12, a transport unit 13, and a decoding unit 14, outputs a broadcast program selected by the user by executing processing, such as demodulating a received and selected carrier.

The controller 30 serves as a microcomputer having a central processing unit (CPU) 32, a dynamic random access memory (DRAM) 33, a program read only memory (program ROM) 34, and a Japanese Character (Kanji) ROM 35, all of which are connected via a bus 31, and controls the individual elements of the receiving apparatus 3. The DRAM 33 is used as a work area for the processing executed by the controller 30. The program ROM 34 stores processing programs executed by the controller 30 and data used for various processing. The Kanji ROM 35 stores font data, such as Kanji font data, used for characters and signs for display.

Connected to the controller 30 are a modem 41, an integrated circuit (IC) card interface 42 (indicated as IC card I/F in FIG. 1), an interface 43 with a remote commander (indicated as a remote controller I/F in FIG. 1), an interface 44 with a florescent display tube provided for the main unit (indicated as a main-unit display I/F in FIG. 1), and information can be transmitted and received between the controller 30 and the above elements.

In this embodiment, the tuner 11 is formed as a synthesizer-type tuner, and phase locked loop (PLL) data, which serves as a channel-selecting control signal, i.e., data representing the scaling ratio of a variable scaling circuit of a PLL loop, is supplied to the tuner 11. The controller 30 is provided with a memory for storing PLL data corresponding to each channel, though this is not shown.

Upon receiving the PLL data, which serves as a channel-selecting control signal, from the controller 30, the tuner 11 selects one of a plurality of carriers contained in the intermediate frequency signal input via the input terminal 3 in. The carrier to be selected is determined by a remote command signal in response to a channel selection command input from a remote commander (not shown) according to the user's input operation.

That is, the user inputs a channel selection command by operating the remote commander, and a remote command signal in response to the channel selection command is output from the remote commander. The remote command signal is input into the controller 30 of the receiving apparatus 3 through the remote commander I/F 43 connected to the controller 30, and the PLL data corresponding to the remote command signal is supplied to the tuner 11 from the controller 30. Alternatively, an operation button key provided for the receiving apparatus 3 may be used to input a channel selection command, though this is not shown.

The output of the tuner 11 is supplied to the front end unit 12. The front end unit 12 includes an analog-to-digital (A/D)

converter, a demodulator, a channel equalizer, an error correction decoder, etc. The front end unit 12 converts the signal from the tuner 11 into a digital signal, and performs digital demodulation on the signal.

The front end unit 12 performs, so-called "ghost canceling", on the digital-demodulated signal, based on the control information from the controller 30, and also corrects bit errors generated on a transmission channel, thereby obtaining a transport stream output. In satellite digital television broadcasting, intensive error-correction-code processing is applied to signals in order to preserve the high and stabilized receiving quality even when signals are received at a low carrier-to-noise (C/N) ratio due to rain or other reason. For example, a modulation method using the Viterbi code, the Reed Solomon code, and the Trellis code is employed.

The front end unit 12 transmits to the transport unit 13 the transport stream output obtained by demodulating and error-correcting the signal. In the transport stream output, the signal is, in most cases, scrambled for limited reception, such as for pay broadcasting.

The transport unit 13 has, as shown in FIG. 1, a descrambler 131, a demultiplexer 132, and a DRAM 133 used as a work area for performing demultiplex processing. The transport stream output from the front end unit 12 is supplied to the descrambler 131 of the transport unit 13. The transport stream signal is descrambled by the descrambler 131.

In order to descramble the transport stream signal in the descrambler 131, an IC card, which is provided by making a contract with a digital broadcast company, is loaded into the IC card interface 42 formed of an IC card reader. The user information, such as contract conditions, is recorded on the IC card. The user information can be overwritten by means such as performing communications with the account center of the broadcast company via the modem 41.

As described later, a descramble key, which is one of the data required for limited reception and which is provided while being multiplexed in the transport stream and extracted by the demultiplexer 132, is supplied to the controller 30. Then, the controller 30 determines, based on the contract information stored in the IC card, whether the transport stream signal is permitted to be descrambled in the receiving apparatus 3. If it is found that the transport stream signal is permitted to be descrambled in the receiving apparatus 3, the descramble key is supplied to the descrambler 131 from the demultiplexer 132 so as to descramble the transport stream signal.

The descrambled transport stream, which consists of a plurality of multiplexed programs, is supplied to the demultiplexer 132. The transport stream is also supplied to the digital interface 20 in order to provide it to digital external units, which will be discussed later.

Figure 2:
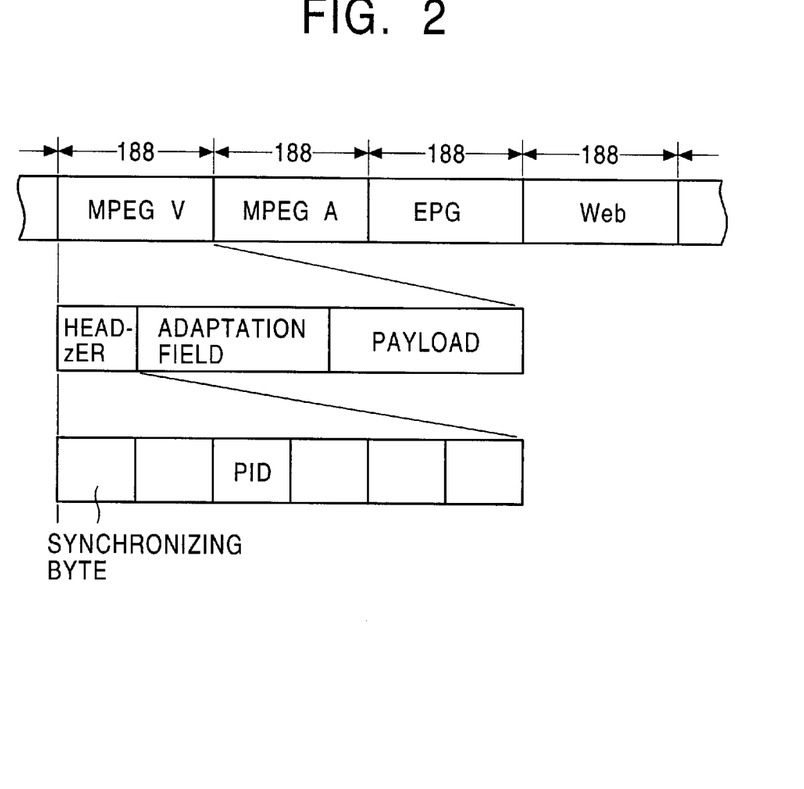
FIG. 2 illustrates a digital broadcast transport stream.

FIG. 2 illustrates the configuration of a transport stream consisting of a plurality of multiplexed programs. The transport stream is, as illustrated in FIG. 2, a bit stream defined by the MPEG system, and is a group consisting of 188-byte fixed-length packets (transport packets).

Each transport packet is formed of a header, an adaptation field for inputting additional information into a specific individual packet, and a payload representing the content of each packet. Stored in the payload are an MPEG-compressed video signal (MPEG V), an MPEG-compressed audio signal (MPEG A), and program data selected by the user, such as various types of data (indicated by Web in FIG. 2), for example, homepages produced by Hyper Text Markup Language (HTML) and game programs.

Further, transport packets storing channel selection data, data representing, for example, a descramble key required for limited reception, service information data for implementing an Electronic Program Guide (EPG) are also multiplexed with transport packets storing the program data. That is, in a transport stream, packets storing data of a plurality of programs are multiplexed with packets indicating program selection data and limited reception data, and service information data.

The header of each transport packet is formed of four bytes, and the leading byte is a synchronizing byte. The header stores not only the synchronizing byte, but also a packet ID (PID) representing packet identification information, and control information concerning the presence or the absence of scrambling, and the presence or the absence of the subsequent adaptation field or the payload.

The demultiplexer 132 executes demultiplexing processing in accordance with the channel-selecting control signal input from the controller 30 via the remote controller interface 43 in response to the program selected E by the user by inputting a remote command. As a consequence, the required packets including the MPEG-compressed video signal, the MPEG-compressed audio signal, and the program selection data or the limited reception data, and the service information data, all of which represent the program selected by the user, are separated and extracted.

Figure 3:
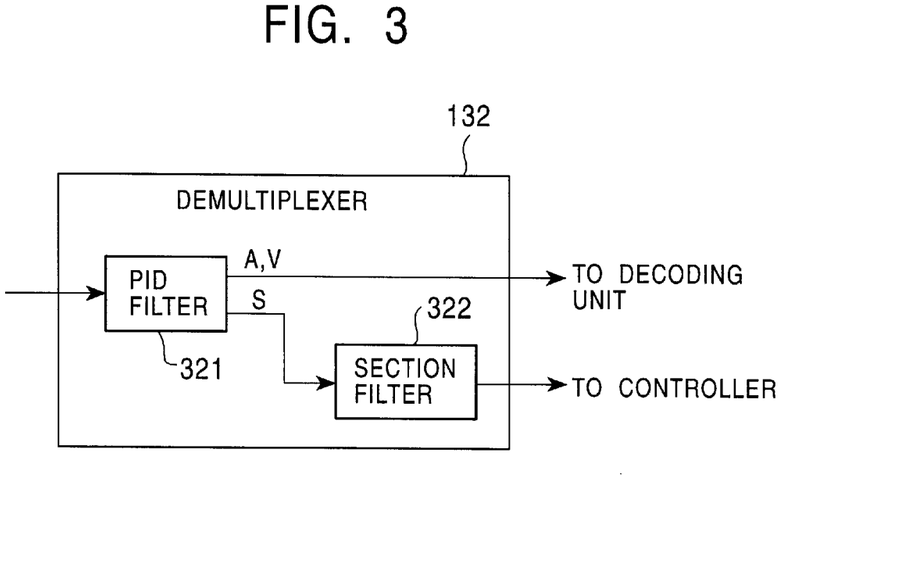
FIG. 3 is a block diagram illustrating a demultiplexer shown in FIG. 1.

FIG. 3 is a block diagram illustrating the demultiplexer 132. The demultiplexer 132 has a PID filter 321 and a section filter 322. In the PID filter 321, based on the PID added to the header of each transport packet, the MPEG-compressed video signal V and the MPEG-compressed audio signal A of the program selected by the user are extracted, and various data S concerning program selection or limited reception is separated and extracted.

The video signal V and the audio signal A of the program selected by the user are then supplied to the decoding unit 14. Meanwhile, the data S is supplied to the section filter 322, and the data, for example, the data concerning program selection or limited reception, is separated and extracted. The data is then supplied to the controller 30.

In the demultiplexer 132, a program clock reference, which is used as a reference for reproducing the video signal and the audio signal, is reproduced based on the synchronizing bit.

The decoding unit 14 is, as shown in FIG. 1, formed of an MPEG decoder 141, a DRAM 142 used as a work area for MPEG-decoding processing, a National Television System Committee (NTSC) encoder 143, and an audio signal digital-to-analog (D/A) conversion circuit 144.

As noted above, the video signal and the audio signal of the program selected by the user are MPEG-compressed. Accordingly, the MPEG decoder 141 decompresses the MPEG-compressed video signal and the MPEG-compressed audio signal supplied from the demultiplexer 132. That is, the MPEG decoder 141 performs MPEG decoding.

The MPEG decoder 141 has an on-screen display (OSD) function so that an EPG or a menu can be overlaid on an image of a target program.

The decompressed video signal is then supplied to the NTSC encoder 143, and is converted into an NTSC analog video signal. The analog video signal is then supplied to a monitor receiver via an external output terminal 15, and an image is displayed on the screen of the monitor receiver.

Meanwhile, the decompressed audio signal is supplied to the audio signal D/A conversion circuit 144, and is converted into an analog audio signal. The analog audio signal is then supplied to a speaker of the monitor receiver via an external output terminal 16, and a sound is emitted from the speaker of the monitor receiver.

According to this embodiment, the digital audio signal (pulse code modulation (PCM) audio signal) decompressed in the MPEG decoder 141 is supplied to the digital interface 20 through which the digital audio signal or the transport stream can be provided to external units.

The digital interface 20 forms output data from the data processed by the receiving apparatus 3 of the first embodiment. The digital interface 20 then transmits the output data to a digital external unit via an input/output terminal 20T, and also receives data input from the digital external unit via the input/output terminal 20T in such a manner that the data can be processed in the receiving apparatus 3. In this manner, according to the receiving apparatus 3 of the first embodiment, the digital interface 20 serves as an interface for outputting a digital signal to the digital external unit from the receiving apparatus 3 and for inputting a digital signal into the receiving apparatus 3 from the digital external unit.

According to the receiving apparatus 3 of the first embodiment, the input/output terminal 20T is an IEEE1394 input/output terminal, which is an interface standard defined by Institute of Electrical and Electronics Engineers (IEEE). Through this input/output terminal 20T, digital data can be input into and output from digital external units, such as a DVTR, a hard disk drive unit for recording and reproducing digital video signals and digital audio signals (hereinafter referred to as the "AVHDD unit"), and an MD unit.

Supplied to the digital interface 20 are, as discussed above, a multi-program transport stream including an MPEG-compressed video signal and an MPEG-compressed audio signal of a plurality of broadcast programs supplied from the descrambler 31, and a digital audio signal of a single broadcast program separated and extracted from the transport stream by the demultiplexer 132 and decompressed by the MPEG decoder 141.

The digital interface 20 of the receiving apparatus 3 outputs either the transport stream or the digital audio signal to the external unit via the input/output terminal 20T under the control of the controller 30 in response to the user's instruction. In the first embodiment, the type of digital signal to be output is selected in accordance with the external unit specified by the user.

As noted above, digital units, such as a DVTR, an AVHDD unit, an MD unit, etc., can be connected to the receiving apparatus 3 of the first embodiment via the input/output terminal 20T. Accordingly, the user of the receiving apparatus 3 operates, for example, a remote commander to supply to the receiving apparatus 3 command information for specifying the digital external unit as a remote command signal.

Upon receiving the command information for specifying the external unit, the controller 30 of the receiving apparatus 3 controls the digital interface 20 in response to the command signal to supply the digital data in accordance with the selected digital external unit via the input/output terminal 20T.

In the first embodiment, the receiving apparatus 3 supplies a transport stream to the DVTR or the AVHDD unit, and supplies an MPEG-decoded digital audio signal of a single broadcast program to the MD unit.

It is now assumed that the input/output terminal 20T of the receiving apparatus 3 of the first embodiment is connected to the digital input terminal of a DVTR via an IEEE interface cable. When the user specifies the DVTR as the digital external unit, as discussed above, the digital interface 20 is operated as follows.

Under the control of the controller 30, the digital interface 20 converts the transport stream output from the descrambler 131 to digital data so that the data can be output via the IEEE1394 interface cable. The digital interface 20 then outputs the digital data to the DVTR via the input/output terminal 20T. This enables the DVTR to record on a vide tape the transport stream supplied from the receiving apparatus 3 of the first embodiment.

It is now assumed that the input/output terminal 20T of the receiving apparatus 3 of the first embodiment is connected to the digital input terminal of the DVTR via an IEEE interface cable. When the user designates the DVTR as the digital external unit so as to input a transport stream recorded on a video tape loaded into the DVTR into the receiving apparatus 3 of the first embodiment, the digital interface 20 is operated as follows.

Digital data having a format of the transport stream compliant with the IEEE1394 standard has been input from the DVTR via the IEEE1394 interface cable and the input/output terminal 20T. Under the control of the controller 30, the digital interface 20 converts such digital data into digital data having a format that can be processed by the receiving apparatus 3, and then supplies it to the demultiplexer 132.

Upon receiving the transport stream, the demultiplexer 132 separates and extracts a video signal and an audio signal of a target program from the transport stream, and performs a set of processing, such as MPEG decoding, on the signals. Thus, an image and a sound of the target program can be output and audio-visually observed through the monitor receiver.

Figure 4:
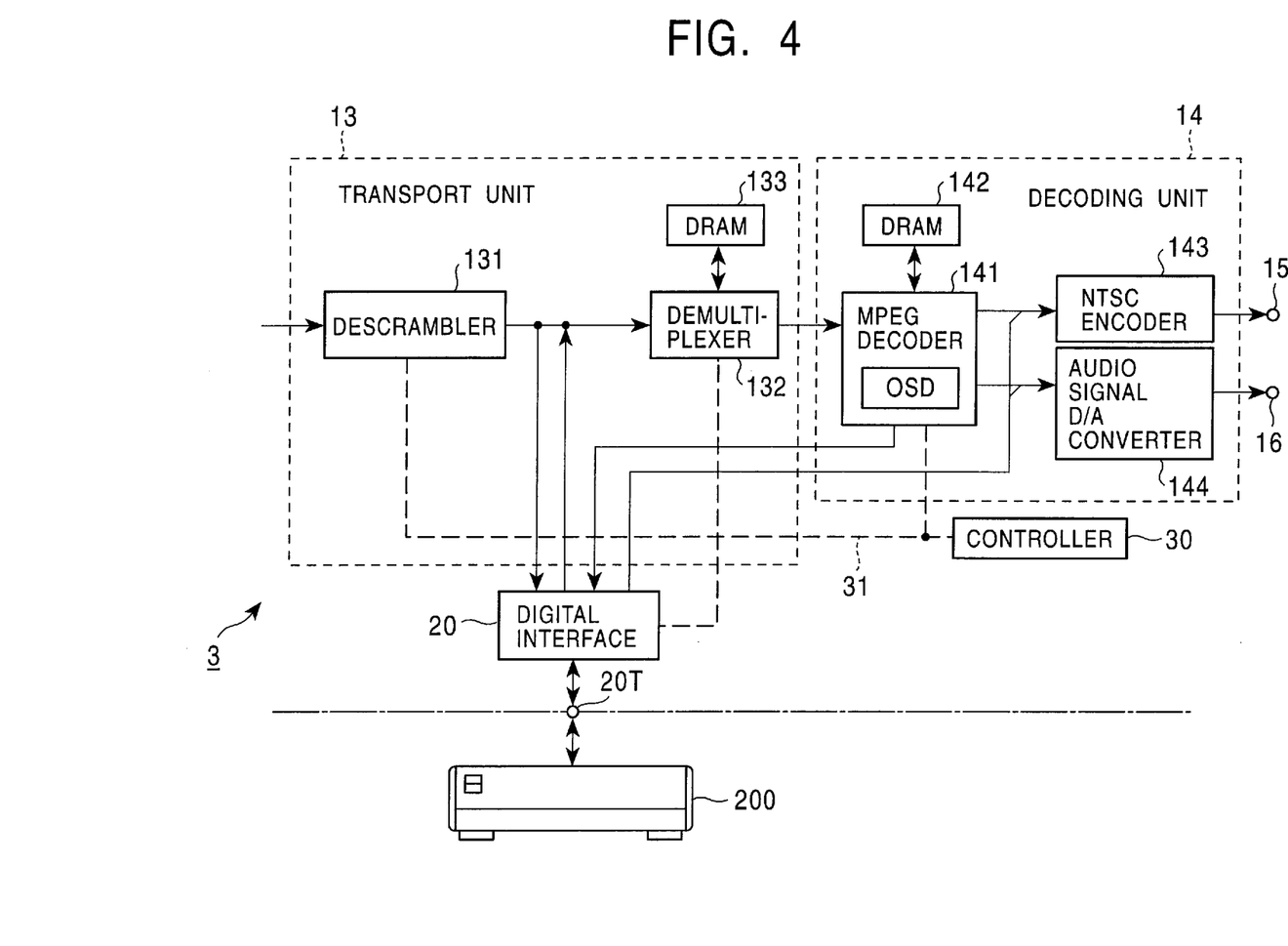
FIG. 4 is a block diagram illustrating the essential elements of the digital broadcast receiving apparatus shown in FIG. 1 to which an audio-visual hard disk drive (AVHDD) unit is connected.

FIG. 4 illustrates the operation of the digital interface 20 performed when the user specifies an AVHDD unit as the digital external unit, as discussed above. In FIG. 4, the input/output terminal 20T of the receiving apparatus 3 is connected to the digital input terminal of the AVHDD unit via an IEEE interface cable. FIG. 4 shows essential portions of the receiving apparatus 3 of the first embodiment, i.e., the transport unit 13, the decoding unit 14, the controller 30, and an AVHDD unit 200 connected to the digital interface 20 via the IEEE1394 interface cable.

As described above, a transport stream output from the descrambler 131 and an MPEG-decoded digital audio signal of a single broadcast program from the MPEG decoder 141 are supplied, as shown in FIG. 4, to the digital interface 20 of the receiving apparatus 3.

When the user specifies the AVHDD unit 200 as the external unit, the digital interface 20 converts, under the control of the controller 30, the transport stream from the descrambler 131 into digital data that can be output via the IEEE1394 interface cable. The digital interface 20 then outputs the converted digital data to the AVHDD unit 200 via the input/output terminal 20T. This enables the AVHDD unit 200 to record on a hard disk (HDD) the transport stream supplied from the receiving apparatus 3 of the first embodiment.

It is now assumed that the input/output terminal 20T of the receiving apparatus 3 is connected to the digital output terminal of the AVHDD unit 200 via an IEEE interface cable. When the user designates the AVHDD unit 200 as the digital external unit so as to input a transport stream recorded on a hard disk of the AVHDD unit into the receiving apparatus 3 of the first embodiment, the digital interface 20 is operated as follows.

Digital data having a format of the transport stream compliant with the IEEE1394 standard has been input from the AVHDD unit 200 via the IEEE1394 interface cable and the input/output terminal 20T. Under the control of the controller 30, the digital interface 20 converts such digital data into digital data having a format that can be processed by the receiving apparatus 3, and then supplies the converted data to the demultiplexer 132.

Upon receiving the transport stream, the demultiplexer 132 separates and extracts a video signal and an audio signal of a target program from the transport stream, and performs a set of processing, such as MPEG decoding, on the signals. Thus, an image and a sound of the target program can be output and audio-visually observed through the monitor receiver.

As described above, according to this embodiment, it is possible to supply transport streams to the DVTR and the AVHDD unit 200 and to record them on recording media. It is also possible to supply to the receiving apparatus 3 transport streams recorded on recording media with the DVTR and the AVHDD unit 200 and to reproduce the transport streams.

Figure 5:
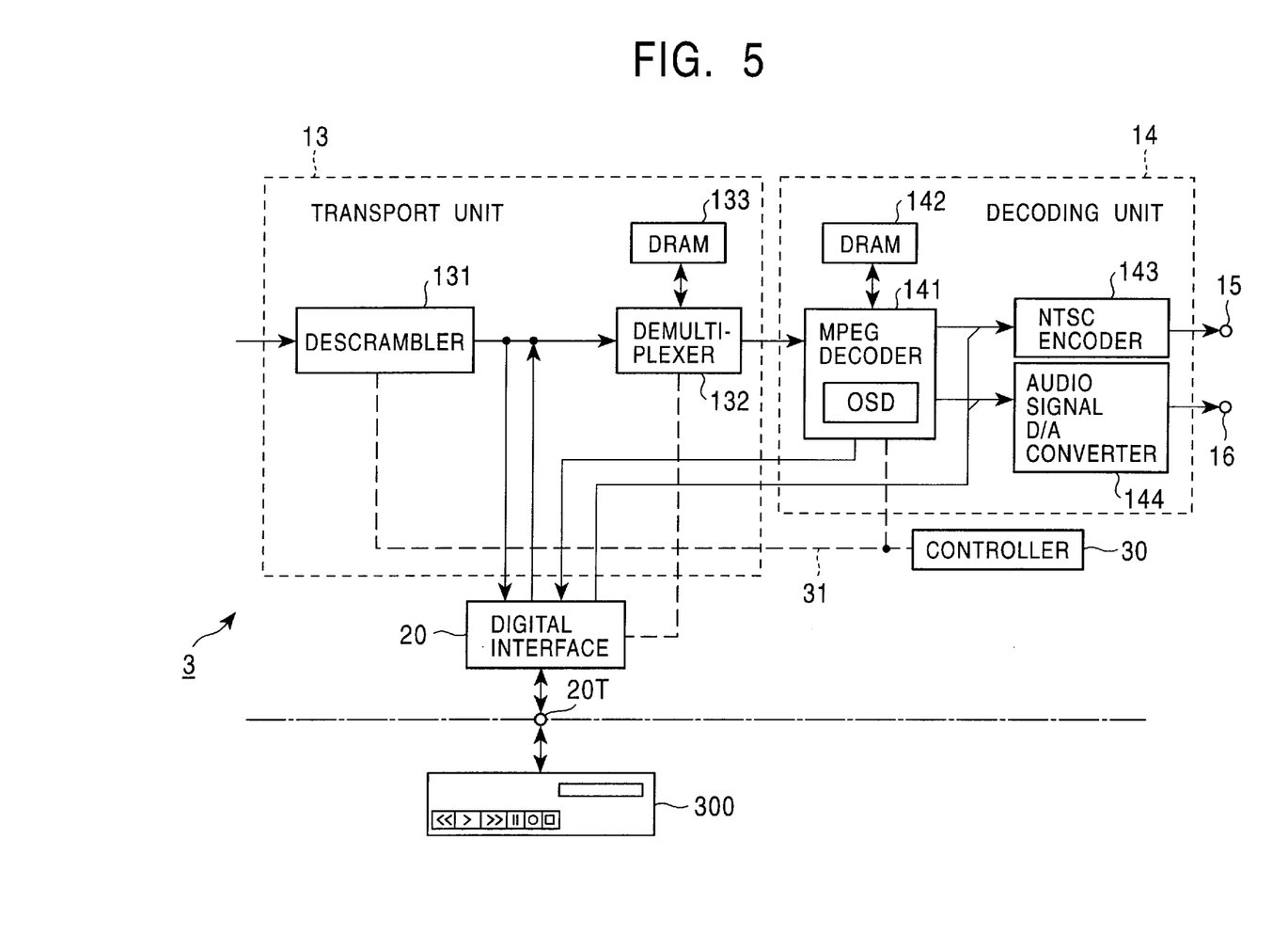
FIG. 5 is a block diagram illustrating the essential elements of the digital broadcast receiving apparatus shown in FIG. 1 to which a mini disc (MD) unit is connected.

FIG. 5 illustrates the operation of the digital interface 20 performed when the user specifies an MD unit 300 as the digital external unit, as discussed above. In FIG. 5, the input/output terminal 20T of the receiving apparatus 3 is connected to the digital input terminal of the MD unit 300 via an IEEE interface cable. FIG. 5 shows essential portions of the receiving apparatus 3 of the first embodiment shown in FIG. 1, i.e., the transport unit 13, the decoding unit 14, the controller 30, and the MD unit 300 connected to the digital interface 20 via the IEEE1394 interface cable.

Among a transport stream from the descrambler 131 and an MPEG-decoded digital audio signal of a single broadcast program from the MPEG decoder 141, the digital interface 20 selects and outputs the MPEG-decoded digital audio signal from the MPEG decoder 141 under the control of the controller 30. More specifically, the digital interface 20 converts the MPEG-decoded digital audio signal (PCM audio signal) supplied from the MPEG decoder 141 into a digital audio signal which is in compliance with the IEC958 standard defined by the International Electrotechnical Commission (IEC) and which can be output via the IEEE1394 interface cable. The digital interface 20 then outputs the converted audio signal to the MD unit 300 via the input/output terminal 20T.

This enables the MD unit 300 to record on an MD the MPEG-decoded digital audio signal of a single broadcast program supplied from the receiving apparatus 3 of the first embodiment. The digital audio signal recorded on the MD is then reproduced with the MD unit 300 and audibly output via, for example, headphones connected to the MD unit 300.

That is, it is possible to record on an MD only the sound of, for example, a music program, or an education program, such as for languages, demodulated by the receiving apparatus 3 of the first embodiment, and to easily reproduce the recorded sound with the MD unit 300. A digital audio signal supplied from the MD unit 300 can be input into the receiving apparatus 3 of the first embodiment via the digital interface 20, and can be D/A-converted and output.

It is now assumed that the input/output terminal 20T of the receiving apparatus 3 is connected to the digital output terminal of the MD unit 300 via an IEEE interface cable. When the user designates the MD unit 300 as the digital external unit so as to input a digital audio signal recorded on an MD of the MD unit into the receiving apparatus 3, the digital interface 20 is operated as follows.

A digital audio signal which can be input and output via an IEEE1394 interface cable and which is in compliance with the IEC958 standard defined by the IEC has been input from the MD unit 300 via the IEEE1394 interface cable and the input/output terminal 20T. Under the control of the controller 30, the digital interface 20 converts such a digital audio signal into a digital audio signal having a format that can be processed by the receiving apparatus 3. The digital audio signal is then supplied, as shown in FIG. 5, to the audio signal D/A converter 144.

In the audio signal D/A converter 144, the digital audio signal is converted into an analog audio signal, which is then supplied to a speaker via an AV amplifier and a monitor receiver. Sound is then emitted from the speaker.

In this manner, the MPEG-decoded digital audio signal recorded on an MD loaded into the MD unit 300 is converted into an analog audio signal by the receiving apparatus 3, and is then supplied to a speaker via an AV amplifier. As a consequence, sound contained in the digital audio signal recorded on the MD unit 300 can be emitted.

Figure 6:
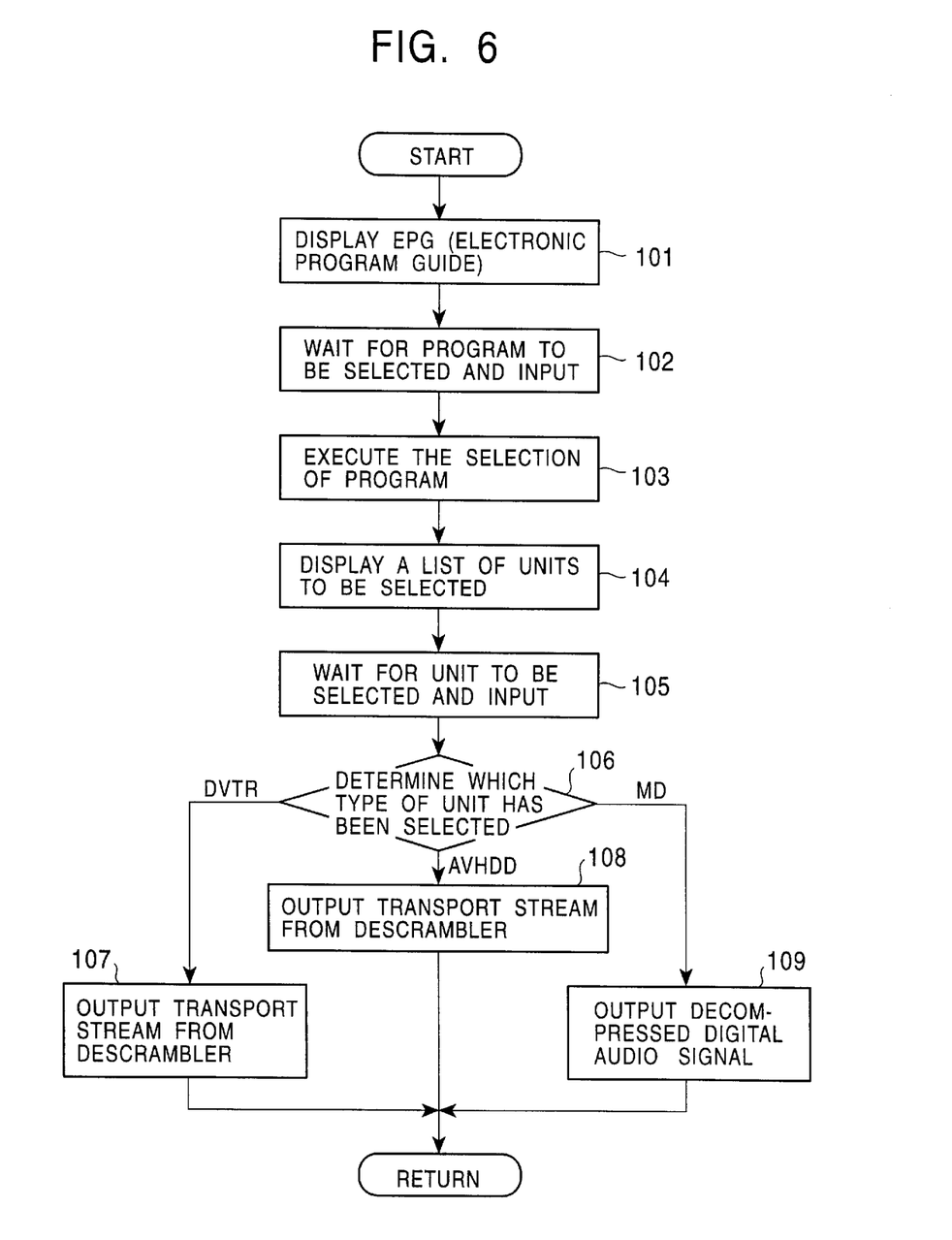
FIG. 6 is a flow chart illustrating the operation performed by the digital broadcast receiving apparatus shown in FIG. 1 when digital data is output via a digital interface.

A description is now given, with reference to the flow chart of FIG. 6, of the operation of the receiving apparatus 3 of the first embodiment performed when digital data is output via the digital interface 20.

As discussed above, digital external units, such as a DVTR, an AVHDD unit, an MD unit, etc., can be connected to the receiving apparatus 3 of the first embodiment via the input/output terminal 20T and the digital interface 20. The digital external unit is selected so that digital data in accordance with the selected digital external unit can be supplied to and received from the receiving apparatus 3.

According to the receiving apparatus 3 of the first embodiment, when the user operates the remote commander provided for the receiving apparatus 3 to select the digital external unit to which digital data is to be supplied or from which it is to be received, the controller 30 starts the processing shown in FIG. 6.

More specifically, upon receiving the operation for selecting the external unit to or from which digital data is to be supplied or received, the controller 30 displays an EPG, based on the EPG data obtained from the transport stream, by using the OSD function provided for the MPEG decoder 141 (step 101). The controller 30 waits for a program contained in the transport stream to be selected and input (step 102).

Subsequently, the controller 30 controls the demultiplexer 132 to select the program based on the program selected by the user (step 103). The controller 30 then displays a list of digital external units to be selected (step 104). The display of the list, as well as the display of the EPG, is performed by using the OSD function provided for the MPEG decoder 141. In the first embodiment, as noted above, a list of external units, such as a DVTR, an AVHDD unit, and an MD unit, to be selected, is displayed.

Thereafter, the controller 30 waits for the digital external unit to be selected (step 105), and determines which type of digital external unit has been selected (step 106).

If it is determined in step 106 that the user has selected the DVTR, the controller 30 controls the digital interface 20 to output the transport stream from the descrambler 131 via the input/output terminal 20T (step 107).

If it is determined in step 106 that the user has selected the AVHDD unit, the controller 30 controls the digital interface 20 to output the transport stream from the descrambler 131 via the input/output terminal 20T in a manner similar to the processing of step 107 (step 108).

If it is found in step 106 that the user has selected the MD unit, the controller 30 controls the digital interface 20 to output the MPEG-decoded digital audio signal of a single broadcast program from the MPEG decoder 141 via the input/output terminal 20T (step 109).

As described above, according to the receiving apparatus 3 of the first embodiment, digital data to be output can be switched in accordance with the type of digital external unit connectable to the receiving apparatus 3 via the external input terminal 20T and the digital interface 20 and selected by the user. Further, when digital data is to be input from the digital external unit via the input/output terminal 20T and the digital interface 20, the digital data is processed in accordance with the selected digital external unit.

More specifically, according to the receiving apparatus 3 of the first embodiment, when information is to be reproduced from digital data by a digital external unit and output to the receiving apparatus 3, processing is performed in a manner similar to the processing executed when digital data is output to the digital external unit, as described above with reference to FIG. 6. That is, a list of digital external units to be selected is displayed so that the digital external unit to supply the digital data to the receiving apparatus 3 can be selected by the user.

If the user selects the DVTR or the AVHDD unit, the controller 30 determines that digital data to be input complies with the format of the transport stream. The controller 30 then controls the digital interface 20 to receive the transport stream from the DVTR or the AVHDD unit, as discussed above, and supplies the received transport stream to the demultiplexer 132.

If the user selects the MD unit as the digital external unit, the controller 30 determines that digital data to be input represents an MPEG-decoded digital audio signal of a single broadcast program. The controller 30 then controls the digital interface 20 to receive the digital audio signal from the MD unit, and supplies it to the audio signal D/A converter 144.

Thus, no matter which digital external unit supplies digital data, processing can be suitably performed in accordance with the digital data, and information can be reproduced from the digital data and be output.

According to the receiving apparatus 3 of the first embodiment, as described above, digital data to be output can be switched in accordance with the type of digital external unit connected to the receiving apparatus 3 via the digital interface 20 and the input/output terminal 20T and selected by the user. Additionally, the receiving apparatus 3 can receive and process digital data in accordance with the digital external unit which supplies the digital data.

In particular, concerning digital data to be output, not only digital data in the format of. the transport stream, but also an MPEG-decoded digital audio signal of a single broadcast program can be output.

Accordingly, when an MPEG-decoded digital audio signal of a single broadcast program is supplied from the receiving apparatus 3 and is recorded on a recording medium by using the MD unit, the recorded digital data is not required to be MPEG-decoded when being reproduced. Thus, the digital data supplied from the receiving apparatus 3 can be directly reproduced and utilized without needing to be input into the receiving apparatus 3 again. That is, broadcast programs provided by digital broadcasting can be utilized more effectively.

In the first embodiment, the video signal and the audio signal of a program provided by digital broadcasting are compressed according to the MPEG method. However, signals compressed according to a method other than the MPEG method may be supplied.

It may be considered, for example, that an audio signal compressed according to the Adaptive Transform Acoustic Coding (ATRAC) method is provided by digital broadcasting. In the ATRAC method, the audible masking effect of humans is utilized to select major sound components and eliminate unnecessary sound components so as to compress audio signals. Audio signals of music programs, for example, may be compressed according to the ATRAC method and be broadcast.

If the audio signal compressed according to the ATRAC method is provided by digital broadcasting, as discussed above, a transport packet containing the ATRAC-compressed audio signal is extracted in the demultiplexer 132 of the receiving apparatus 3. The extracted transport packet is then supplied to the controller 30 via the bus 31 and is temporarily stored in the DRAM 33 of the controller 30.

By the controller 30, the ATRAC-compressed audio signal is extracted from the transport packet temporarily stored in the DRAM 33. The extracted audio signal is then supplied to the digital interface 20 via the bus 31.

The digital interface 20 is provided with a decompression function of decompressing ATRAC-compressed audio signals, and the ATRAC-compressed audio signal supplied from the controller 30 is then decompressed and is output.

According to the first embodiment, it is thus possible to decompress the ATRAC-compressed audio signal and to provide it to a digital external unit, for example, an MD unit, an AVHDD unit, or a DVTR.

Alternatively, a software decoder compatible with the ATRAC method and executable by the controller 30 may be stored in the program ROM 34, and the ATRAC-compressed audio signal may be decompressed by using the software decoder and be provided to a digital external unit, such as an MD unit.

The ATRAC-compressed audio signal can be directly output from the digital interface 20 via the input/output terminal 20T without being decompressed. This is effective for external units, such as MD units, that can receive ATRAC-compressed audio signals and directly record them on a recording medium.

To reproduce ATRAC-compressed audio signals, an ATRAC decoder, which is a decompression function for decompressing ATRAC-compressed audio signals, may be provided for the decoding unit 14 of the receiving apparatus 3. Then, the ATRAC-compressed audio signals can be reproduced by the receiving apparatus 3.

Alternatively, the receiving apparatus 3 may not be provided with an ATRAC decoder and directly provide ATRAC-compressed audio signals by digital broadcasting. Accordingly, the audio signals are received, but cannot be utilized before they are recorded on a recording medium with, for example, an MD unit. That is, it is possible to provide a new provision form of audio signals by using digital broadcasting.

The transport stream includes, as discussed above, not only video signals and audio signals of broadcast programs, but also data, such as, what is called, homepages and game programs. That is, in digital television broadcasting, not only television broadcast programs, but also content data, such as homepages and game programs can be broadcast. Such data utilized by the user, as well as the above-described ATRAC-compressed audio signals, is extracted by the demultiplexer 132, and is then supplied to the controller 30 via the bus 31 and further to the digital interface 20 via the controller 30.

The user data, such as homepages and game programs, provided by digital broadcasting, can be supplied to the digital external unit, for example, a DVTR, an AVHDD unit, or an MD unit, via the input/output terminal 20T from the digital interface 20, and can be recorded on a recording medium with the digital unit.

As described above, transport streams are supplied to the DVTR or the AVHDD unit from the receiving apparatus 3. Alternatively, either of the transport stream, or digital data, such as content information, to be supplied from the demultiplexer 132 via the controller 30, may be selected.

As a result, the content information, as well as the transport streams, can be recorded on a recording medium with the DVTR or the AVHDD unit.

That is, the user data, such as content information, provided by digital television broadcasting, can be supplied to a digital external unit via the digital interface 20, and be recorded on a recording medium. The user data recorded on the recording medium can also be reproduced with the use of the digital external unit and be utilized.

Second Embodiment

Figure 7:
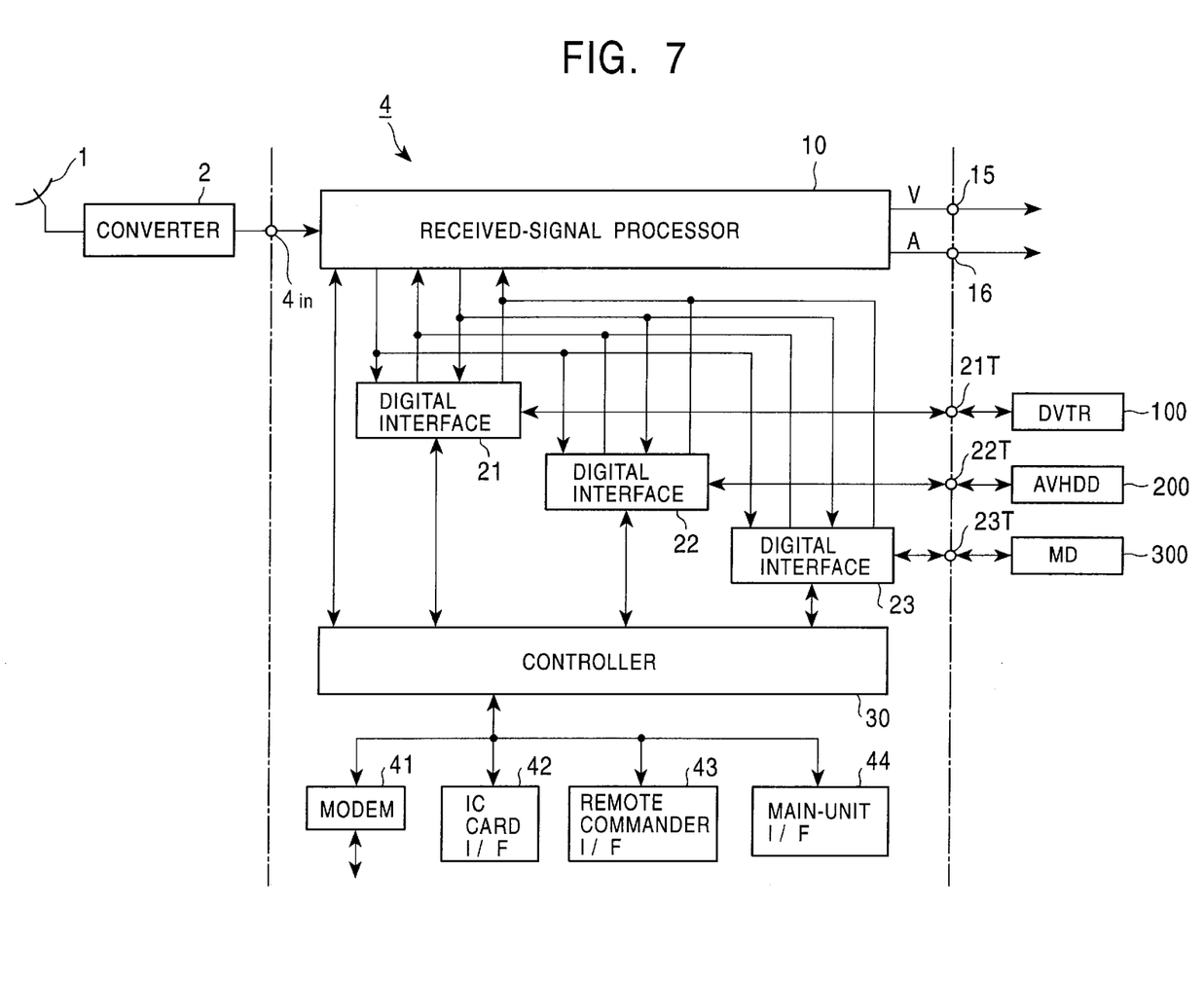
FIG. 7 is a block diagram illustrating a digital broadcast receiving apparatus according to a second embodiment of the present invention.

FIG. 7 is a block diagram illustrating a digital broadcast receiving apparatus 4 according to a second embodiment of the present invention. The digital broadcast receiving apparatus 4 of the second embodiment, as well as the receiving apparatus 3 of the first embodiment described with reference to FIG. 1, includes a received-signal processor 10, and a controller 30 to which a modem 41, an IC card interface 42, a remote commander interface 43, and a main-unit display interface 44 are connected. The received-signal processor 10 and the controller 30 are constructed similarly to those of the receiving apparatus 3 of the aforementioned first embodiment.

More specifically, a target carrier is selected from intermediate frequency signals supplied via the received-signal processor 10, an antenna 1, a converter 2, and an input terminal 4 in. From the selected carrier, a transport stream in which a plurality of broadcast program signals are multiplexed is obtained. Then, a target broadcast program signal is extracted from this transport stream, and the extracted signal is decompressed and D/A converted so that an analog output video signal and an analog output audio signal can be formed and output. The controller 30 serves to control the individual elements of the receiving apparatus 4.

The receiving apparatus 4 of the second embodiment has a plurality of digital interfaces 21 through 23 and input/output terminals 21T through 23T corresponding to the respective digital interfaces 21 through 23, so that a plurality of digital external units can be simultaneously connected to the receiving apparatus 4.

When a digital external unit is connected to one of the input/output terminals 21T through 23T, the controller 30 of the receiving apparatus 4 is adapted to identify what type of digital unit is connected to which input/output terminal.

The receiving apparatus 4 of the second embodiment is, as shown in FIG. 7, configured as follows. When a DVTR 100, an AVHDD unit 200, and an MD unit 300 are simultaneously connected to the receiving apparatus 4, the connected digital units can be designated. Then, the digital interfaces 21 through 23 corresponding to the designated digital units are controlled to supply or receive digital data to or from the receiving apparatus 4.

Figure 8:
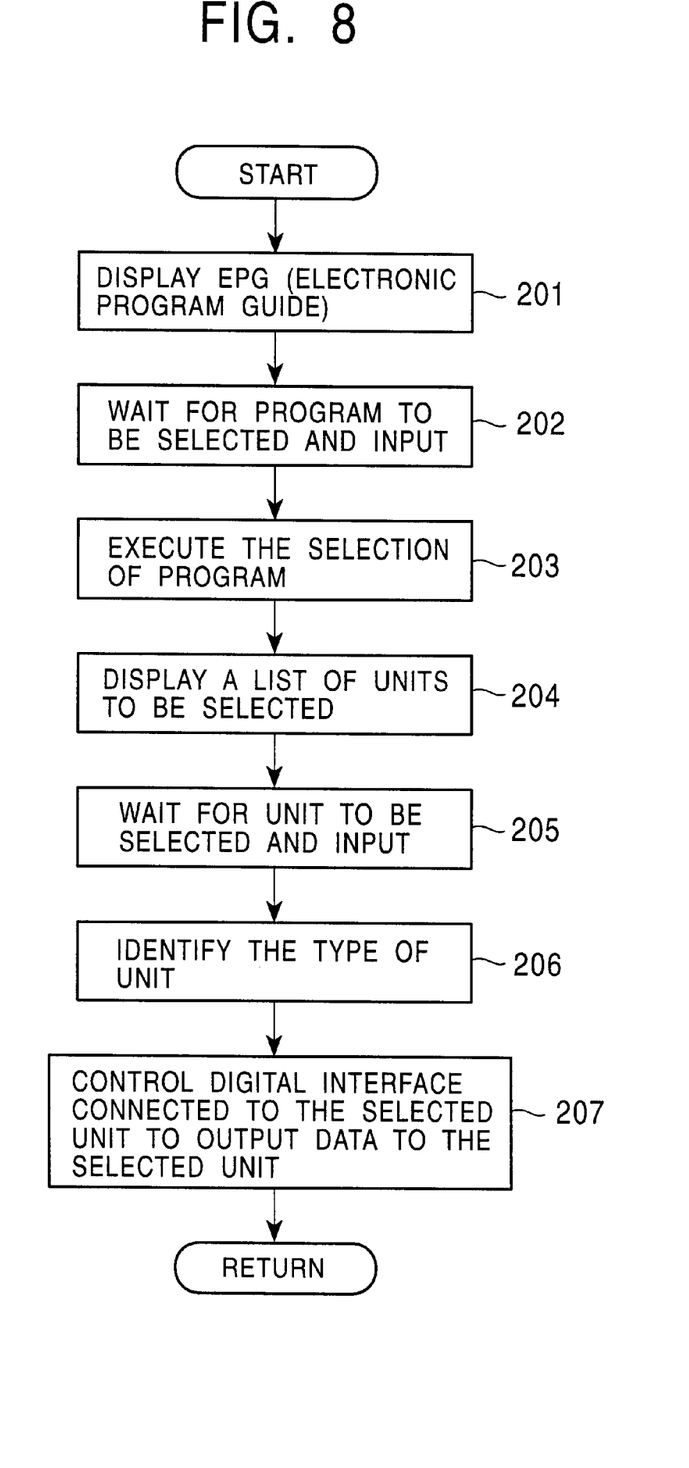
FIG. 8 is a flow chart illustrating the operation performed by the digital broadcast receiving apparatus shown in FIG. 7 when digital data is output via a digital interface.

FIG. 8 is a flow chart illustrating the operation performed when digital data is output via the digital interfaces 21 through 23 in the receiving apparatus 4 of the second embodiment.

According to the receiving apparatus 4 of the second embodiment, as well as the receiving apparatus 3 of the aforementioned first embodiment, when the user operates a remote commander provided for the receiving apparatus 4 so as to select the external unit to which digital data is supplied or from which it is received, the controller 30 starts the processing shown in FIG. 8.

In the flow chart illustrated in FIG. 8, processing of steps 201 through 203 are similar to processing of steps 101 through 103 performed by the receiving apparatus 3 of the first embodiment described with reference to FIG. 6.

Subsequent to the display of an EPG (step 201), the input of selecting a program (step 202), and the execution of selecting a program (step 203), the controller 30 displays a list of digital external units to be selected in accordance with the digital external units connected to the receiving apparatus 4 of the second embodiment (step 204).

When digital external units are connected to the input/output terminals 21T through 23T, as noted above, the controller 30 of the receiving apparatus 4 is able to identify which type of external unit is connected to which input/output terminal.

Then, in step 204, the controller 30 displays a list of digital external units connected to the receiving apparatus 4. The display of the list, as well as the display of the EPG, is performed by using the OSD function of the MPEG decoder 141.

Subsequently, the controller 30 receives the input of selecting a digital external unit from the list of digital external units (step 205), and then identifies the type of selected digital external unit (step 206).

The controller 30 then controls one of the digital interfaces 21, 22, and 23 connected to the selected digital external unit to output digital data to the selected digital external unit (step 207).

If the selected digital external unit is the DVTR 100 or the AVHDD unit 200, the controller 30 controls the digital interface connected to the selected digital external unit to output a transport stream from the descrambler 131 to the digital external unit.

In the embodiment illustrated in FIG. 7, when the DVTR 100 is selected, the controller 30 controls the digital interface 21 to supply a transport stream from the descrambler 131 to the DVTR 100. When the AVHDD unit 200 is selected, the controller 30 controls the digital interface 22 to supply a transport stream from the descrambler 131 to the AVHDD unit 200.

When the selected digital external unit is the MD unit 300, the controller 30 controls the digital interface 23 connected to the MD unit 300 to output an MPEG-decoded digital audio signal of a single broadcast program from the MPEG decoder 141 to the MD unit 300.

That is, in the embodiment shown in FIG. 7, when the MD unit 300 is selected, the controller 30 controls the digital interface 23 to supply a digital audio signal from the MPEG decoder 141 to the MD unit 300.

In this manner, the receiving apparatus 4 of the second embodiment, as well as the receiving apparatus 3 of the first embodiment, can switch digital data to be output in accordance with the external unit connected to the receiving apparatus 4 and selected by the user.

Any of the DVTR 100, the AVHDD unit 200, and the MD unit 300 can be connected to the input/output terminals 21T through 23T. Accordingly, no matter which digital external unit is connected to any input/output terminal, digital data can be supplied to and received from the digital unit selected by the user.

In the second embodiment, transport streams are supplied to the DVTR 100 or the AVHDD unit 200, while MPEG-decoded digital audio signals are supplied to the MD unit 300. However, this is not exclusive.

Transport streams from the descrambler 131 and decompressed digital audio signals of a single broadcast program from the MPEG decoder 141 are supplied, as shown in FIG. 7, to each of the digital interfaces 21, 22, and 23. Accordingly, a modification is made, for example, so that a transport stream and an MPEG-decoded digital audio signal may be supplied to each of the DVTR 100 and the AVHDD unit 200, and the user may select the transport stream or the digital audio signal to be output.

That is, digital data supplied from the receiving apparatus of the present invention via the digital interface may be selected according to the purpose of the use of the digital external unit to be connected or the capacity or the function of a recording medium for use in the digital external unit.

According to the receiving apparatus 4, of the second embodiment, as well as the receiving apparatus 3 of the first embodiment, digital audio signals compressed by, for example, the ATRAC method, and content data, such as what is called, homepages and game programs, can be output to external units via the controller 30 and the digital interfaces 21, 22, and 23.

Moreover, digital data having a format of the transport stream which is input from a digital external unit may be supplied to the demultiplexer 132 via each of the digital interfaces 21, 22, and 23, and a decompressed digital audio signal input from a digital external unit may be supplied to the audio signal D/A converter 144.

This makes it possible to receive digital data and suitably process it in accordance with the digital external unit that is to supply the data. That is, digital data having a format of the transport stream and decompressed digital audio signals can be received and reproduced and output.

In the foregoing first and second embodiments, transport streams and MPEG-decoded digital audio signals, or content data are supplied to the digital interfaces. This is not, however, exclusive. MPEG-decoded digital video signals may be supplied to the digital interfaces, for example, MPEG-decoded digital video signals and MPEG-decoded digital audio signals of a single broadcast program may be supplied to the DVTR and the AVHDD unit. In this case, since the MPEG-decoded digital video signals contain a large amount of data, the transmission rate can be increased to implement this modification.

In the foregoing first and second embodiments, as external units connectable to the digital broadcast receiving apparatus, a DVTR, an AVHDD unit, and an MD unit are used. However, various types of digital units for recording and reproducing digital data on and from recording media may be used. For example, a digital video disk (DVD) unit for recording and reproducing digital data on and from a DVD, which serves as a recording medium, a floppy disk unit using a floppy disk as a recording medium, and a CD-ROM unit using a rewritable CD-ROM as a recording medium, may be connected to the receiving apparatus of the present invention.

In the digital broadcast receiving apparatuses of the respective first and second embodiments, a digital broadcast in which a plurality of broadcast program signals are multiplexed on a single carrier is received and processed. The present invention is, however, applicable to a digital broadcast in which a single broadcast program signal is carried on a single carrier.

More specifically, a single broadcast program signal carried on a single carrier may be received and demodulated. Then, the demodulated signal and a signal obtained by decompressing this demodulated signal may be supplied to the digital interface and be output to the external unit according to the user's instruction.

What is claimed is:

1. A digital broadcast receiving apparatus for receiving broadcast program signals, comprising:

broadcast program extraction means for extracting from said broadcast program signals compressed data including a broadcast program selected and specified by a user;

decompression means for decompressing the compressed data extracted by said broadcast program extraction means and for outputting decompressed data;

digital interface means for receiving the compressed data extracted by said broadcast program extraction means and the decompressed data from said decompression means, and for outputting each of the compressed data and the decompressed data to a digital external unit; and control means for controlling, based on an instruction from the user, the selection of an output from said digital interface means to said digital external unit, said output being selected from the compressed data extracted by said broadcast program extraction means and the decompressed data from said decompression means.

2. The digital broadcast receiving apparatus according to claim 1, wherein said broadcast program extraction means comprises a tuner for selecting a carrier component including the broadcast program selected and specified by the user, a front end unit for demodulating the carrier component selected by said tuner and for outputting a transport stream, and selected-program extraction means for extracting compressed data of the broadcast program selected and specified by the user from the transport stream output from said front end unit, and said broadcast program extraction means outputs the transport stream from said front end unit to said digital interface means and also outputs the compressed data of the broadcast program from said selected-program extraction means to said decompression means;

wherein said digital interface means receives the transport stream from said front end unit and decompressed data from said decompression means and outputs each of the transport stream and the decompressed data to the digital external unit; and wherein said control means controls, based on an instruction from the user, the selection of an output of the transport stream or the decompressed data to the digital external unit from said digital interface means.

3. The digital broadcast receiving apparatus according to claim 1, wherein the compressed data comprises data which is compressed by an MPEG method.

4. A digital broadcast receiving apparatus for receiving a mixture of broadcast program signals provided as non-compressed data and broadcast program signals provided as compressed data, said apparatus comprising:

a tuner for selecting a carrier component including a signal of a broadcast program selected and specified by a user;

a front end unit for demodulating the carrier component selected by said tuner and for outputting a transport stream;

selected-program extraction means for extracting the non-compressed data or the compressed data of the broadcast program selected and specified by the user from the transport stream supplied from said front end unit;

digital interface means for receiving the transport stream from said front end unit and the non-compressed data extracted by said selected-program extraction means and for outputting each of the transport stream and the non-compressed data to a digital external unit; and control means for controlling, based on an instruction from the user, the selection of an output of the transport stream or the non-compressed data to the digital external unit from said digital interface means.

5. The digital broadcast receiving apparatus according to claim 4, further comprising decompression means for decompressing, in a case where the signal of the broadcast program extracted by said selected-program extraction means is compressed data, the compressed data, and for outputting decompressed data;

wherein said digital interface means receives the transport stream from said front end unit, the non-compressed data from said selected-program extraction means, and the decompressed data from said decompression means, and outputs each of the transport stream, the non-compressed data, and the decompressed data to the digital external unit; and wherein said control means controls, based on an instruction from the user, the selection of an output of the transport stream, the non-compressed data, or the decompressed data from said digital interface means.

6. The digital broadcast receiving apparatus according to claim 4, wherein the compressed data comprises data which is compressed by an MPEG method.

7. The digital broadcast receiving apparatus according to claim 4, wherein the non-compressed data comprises digital data compressed by a method other than an MPEG method.

8. A method of receiving a digital broadcast comprising extracting from the digital broadcast compressed data including a broadcast program selected and specified by a user;

decompressing the compressed data to form decompressed data;

outputting, in a main outputting step, each of the compressed data and the decompressed data to a digital external unit; and controlling, based on an instruction from the user, the selection of an output from said main outputting step to said digital external unit, said output being selected from the compressed data and the decompressed data.

9. The digital broadcast receiving method according to claim 8, wherein said extracting step comprises selecting a carrier component including a signal of the broadcast program selected and specified by the user;

demodulating the carrier component and outputting a transport stream;

extracting the compressed data of the broadcast program selected and specified by the user from the transport stream;

outputting the transport stream from said demodulating step to said main outputting step;

outputting the compressed data of the broadcast program from said selected-program extraction step;

wherein said main outputting step outputs each of the transport stream output from said demodulating step and the decompressed data from said decompressing step to a digital external unit; and wherein said controlling step controls, based on an instruction from the user, the selection of an output from said main outputting step to said digital external unit, said output being selected from the transport stream and the decompressed data.

10. A method of receiving a digital broadcast which is a mixture of broadcast program signals provided as non-compressed data and broadcast program signals provided as compressed data, comprising selecting a carrier component including a signal of a broadcast-program selected and specified by a user;

demodulating the carrier component and outputting a transport stream;

extracting the non-compressed data or the compressed data of the broadcast program selected and specified by the user from the transport stream;

receiving the transport stream from said demodulating step and the non-compressed data extracted in said extracting step, and outputting each of the transport stream and the non-compressed data to a digital external unit; and controlling, based on an instruction from the user, the selection of an output from said receiving step to the digital external unit, said output being selected from the transport stream and the non-compressed data.

11. The digital broadcast program receiving method according to claim 10, further comprising decompressing the compressed data, in a case where the signal of the broadcast program extracted in said extracting step is compressed data, and outputting decompressed data;

wherein said receiving step outputs each of the transport stream from said demodulating step, the non-compressed data from said extracting step, and the decompressed data from said decompressing step to the digital external unit; and wherein said controlling step controls, based on an instruction from the user, the selection of an output of the transport stream, the non-compressed data, or the decompressed data from said receiving step.

12. A digital broadcast receiving apparatus for receiving broadcast program signals, comprising:

a front end, responsive to the received broadcast program signals, for providing a multiplexed transport stream of compressed data representing a plurality of multiplexed programs;

a demultiplexer for providing a selected one of the plurality of multiplexed programs;

a decompressor for decompressing the selected one of the plurality of multiplexed programs and providing decompressed data;

a digital interface for receiving the multiplexed transport stream of compressed data, the decompressed data, and compressed data associated with the selected one of the plurality of multiplexed programs, wherein the digital interface decompresses the compressed data associated with the selected one of the plurality of multiplexed programs; and wherein the digital interface provides, as output, each of the compressed data and the decompressed data to a digital external unit; and a control unit for controlling, based on an instruction from a user, a selection of an output from said digital interface to said digital external unit, said output being selected from the compressed data and the decompressed data.

13. A digital broadcast receiving apparatus for receiving broadcast program signals, comprising:
- a front end, responsive to the received broadcast program signals, for providing a multiplexed transport stream of compressed data representing a plurality of multiplexed programs;
- a demultiplexer for providing a selected one of the plurality of multiplexed programs;
- a decompressor for decompressing the selected one of the plurality of multiplexed programs and providing decompressed data;
- a plurality of digital interfaces, each receiving he multiplexed transport stream of compressed data and the decompressed data, and wherein the digital interface provides each of the compressed data and the decompressed data as output to an associated digital external unit; and
- a control unit for controlling, based on an instruction from a user, a selection of an output from one of the plurality of digital interfaces the associated digital external unit said output being selected from the compressed and the decompressed data.

* * * * *